(12) United States Patent
Farinelli et al.

(10) Patent No.: US 7,932,514 B2
(45) Date of Patent: Apr. 26, 2011

(54) MICROWAVE READOUT FOR FLUX-BIASED QUBITS

(75) Inventors: Matthew J. Farinelli, Bronx, NY (US); George A. Keefe, Cortlandt Manor, NY (US); Shwetank Kumar, White Plains, NY (US); Matthias Steffen, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 12/126,015

(22) Filed: May 23, 2008

(65) Prior Publication Data

US 2009/0289638 A1    Nov. 26, 2009

(51) Int. Cl.
    *H01L 39/22*    (2006.01)
(52) U.S. Cl. .................... 257/31; 257/30; 257/E39.012; 324/652
(58) Field of Classification Search .................... 257/14, 257/31, 30, 38, E39.012; 324/652
    See application file for complete search history.

(56) References Cited

U.S. PATENT DOCUMENTS

| | | | |
|---|---|---|---|
| 7,135,701 B2 | 11/2006 | Amin et al. | |
| 7,230,266 B2 | 6/2007 | Hilton et al. | |
| 7,418,283 B2 | 8/2008 | Amin | |
| 2005/0224784 A1* | 10/2005 | Amin et al. | ....... 257/14 |

OTHER PUBLICATIONS

Simon Haykin, Communication Systems, Third Edition, (John Wiley & Sons, 1994, ISBN 9971-51-170-3).

D.P. Divincenzo, "The Physical Inplementation of Quantum Computation", Fortschritte der Physik, vol. 48, pp. 771-783, (2000).
P. Day et al., "A Superconducting Detector Suitable for Use in Large Arrays", Nature, vol. 425, pp. 817-821, (2003).
I. Chiorescu et al., "Coherence Quantum Dynamics of a Superconducting Flux Qubit", Science, vol. 299, pp. 1869-1871 (Mar. 2003).
M. Muck, C. Welzel, and J. Clarke, "Superconducting Quantum Interface Device Amplifiers At Gigahertz Frequencies", Applied Physics Letters, vol. 82, No. 19, pp. 3266-3268 (May 2003).
R.W. Simmonds et al., "Decoherence in Josephson Phase Qubits From Junction Resonators", Physical Review Letters, vol. 93, No. 7, pp. 077003 (Aug. 2004).
K.B. Cooper et al., "Observation of Quantum Oscillations between a Josephson Phase Qubit and a Microscopic Resonator Using Fast Readout", Physical Review Letters, vol. 93, No. 18, pp. 180401, (Oct. 2004).
J. Martinis et al., "Decoherence in Josephson Qubits From Dielectric Loss", Physical Review Letters, pp. 210503 (2005).

(Continued)

*Primary Examiner* — Thinh T Nguyen
(74) *Attorney, Agent, or Firm* — Cantor Colburn LLP; Vazken Alexanian (57) ABSTRACT

A method for determining whether a quantum system comprising a superconducting qubit is occupying a first basis state or a second basis state once a measurement is performed is provided. The method, comprising: applying a signal having a frequency through a transmission line coupled to the superconducting qubit characterized by two distinct, separate, and stable states of differing resonance frequencies each corresponding to the occupation of the first or second basis state prior to measurement; and measuring at least one of an output power or phase at an output port of the transmission line, wherein the measured output power or phase is indicative of whether the superconducting qubit is occupying the first basis state or the second basis state.

16 Claims, 6 Drawing Sheets

OTHER PUBLICATIONS

M. Steffen et al., "State Tomography of Capacitively Shunted Phase Qubits With High Fidelity", Physical Review Letters, pp. 050502 (Aug. 2006).

K.D. Osborn et al., "Frequency-Tunable Josephson Junction Resonator", IEEE Transactions on Applied Superconductivity, vol. 17, issue 2, pp. 166-168 (Jun. 2007).

J. Majer, "Coupling Superconducting Qubits Via a Cavity Bus", Nature, vol. 449, pp. 443 (2007).

R.H. Koch et al., "Experimental Demonstration of an Oscillator Stabilized Josephson Flux Qubit", Physical Review Letters, pp. 127001-1-127001-4, (Mar. 2006).

* cited by examiner

MICROWAVE READOUT FOR FLUX-BIASED QUBITS

STATEMENT REGARDING FEDERALLY SPONSORED RESEARCH OR DEVELOPMENT

Embodiments of this invention may have been made with governmental support under Contract No. HR0011-06-C-0051A. Therefore, the U.S. Government may have a paid-up license to portions or embodiments of this invention and the right in limited circumstances to require the patent owner to license to others on reasonable terms as provided for by the terms of, Contract No. HR0011-06-C-0051A.

BACKGROUND OF THE INVENTION

1. Field of the Invention

The invention relates to the field of quantum computing, and particularly to superconducting quantum computing and read-out for flux-biased qubits.

2. Description of Background

Quantum computing is a new paradigm of computing requiring fundamentally fewer resources to solve certain computationally interesting problems compared to classical computing. This feat is enabled by several peculiar properties found in quantum systems that are impossible to achieve in classical systems: the ability for a quantum system to be in a superposition of several of its eigenstates and the ability for several quantum systems to be entangled with one another.

The requirements for building a large-scale quantum computer, however, are more intricate than the properties of superposition and entanglement alone. In fact, there is a set of requirements that must be fulfilled in order to build a practical quantum computer. One requirement is to have a system of quantum bits (qubits) which can be initialized to a known state. Another requirement is the ability to manipulate this state by applying single and multi-qubit gate operations such that any arbitrary logic operation can be implemented. Finally, the outcome of the computation must be measured through known techniques.

Although these requirements sound trivial at first, in practice it is significantly more challenging to find or design an appropriate system that satisfies these conditions simultaneously. For a quantum system to retain the delicately created superposition and entangled states for sufficiently long times (called coherence times) it must be well isolated from the environment. However, in order to manipulate the quantum system according to the steps of the desired algorithm it must inherently also be coupled to the external environment thereby introducing noise mechanisms that reduce coherence times. It is precisely these opposing requirements that represent a challenge for theorists and experimentalists alike to design an appropriate system.

The most favorable feature of superconducting qubits is their compatibility with standard modern Silicon microfabrication techniques. It is therefore believed that the fabrication of thousands or millions of qubits on a chip is possible. In addition it is hoped that these may be integrated with other silicon or other semiconductor devices.

Even for superconducting qubits, it remains challenging to design a circuit that gives rise to a quantum mechanical system useful as a qubit. Several designs emerged over the years and generally fit into three categories: charge qubits, flux qubits, and phase qubits (or hybrid designs).

The names for the different types of qubits are loosely related to the physically differing quantities for the logical |0™ and |1™ states. For example, the charge qubit derived its name based on the presence of an excess Cooper pair (|1™ state) or the lack of one (|0™ state). This is similar to classical bits where the logical states 0 and 1 are also physically distinct states. Over the past several years the correlation between the qubit name and physical interpretation of the quantum states became more ambiguous. Careful device engineering has lead to qubits whose logical states are physically less distinct. Because it is more difficult to distinguish the two states, the impact of the residual coupling to the environment is also reduced thereby making the coherence time of the qubits longer. As a result, however, a desired measurement of the device is also more cumbersome.

A desired measurement is defined as determining which of the logical quantum states is occupied. There are a variety of ways this can be achieved. In the so-called quantum non-demolition (QND) measurements, the measurement is achieved without projecting the state out of the qubit manifold (or "destroying" the qubit) and the system remains in the state that has been measured, up to the coherence time if it is the excited state. This has the advantage that resetting the qubit into a desired state is straightforward but the measurement times generally increase and the engineering of such a measurement is also often quite challenging.

The measurement can also be achieved in a different way, often in two separate steps. In the first step, one of the two states of the qubit is selectively projected onto a different state that is physically very distinct from the remaining one. After this step, the qubit is, as far as the wave function of the system is concerned, already measured and additional decoherence or strong coupling to the environment is usually no longer detrimental provided both states are a local ground state. The step can be referred to as the actual 'measurement'. In the second step, it is now possible to determine what happened during the measurement, which can be referred to as the 'read-out'. The 'read-out' simply determines which state the qubit occupies, which then reveals the state of the qubit before 'measurement'. It is sometimes possible to perform the read-out long after measurement given that the two possible outcomes are macroscopically stable states.

For example, suppose that the 'measurement' projects the qubit from state |0™ to state |A™ and state |1™ to state |B™ with 100% accuracy. Both |A™ and |B™ are very distinct states and locally correspond to a quasi stable state. The read-out now determines if the qubit is in state |A™ or |B™ which then reveals whether or not the qubit was in |0™ or |1™ prior to measurement.

Currently, all superconducting qubit measurement and/or read-out designs either require a relatively strong coupling of the qubit to other nonlinear superconducting circuit elements such as a superconducting quantum interference device (SQUID), or are based on other techniques that indirectly probe the qubit state.

Most designs rely on coupling the qubit sufficiently strongly to a SQUID (either DC or RF) and then measuring the response of the SQUID either by using direct current or microwave techniques. By coupling the qubit strongly to a SQUID new potential decoherence channels are introduced. The SQUID is inherently also a quantum mechanical object and can be characterized by a quality factor. Because the SQUID is itself coupled to external bias leads it generally has low quality factors, which the qubit is exposed to via the coupling mechanism. Although the extent of the residual coupling can be minimized, the procedure requires careful calibration or design layouts and even small deviations can negatively impact qubit performance.

By using direct current techniques to measure the response of the SQUID, the SQUID switches to a voltage state which introduces heating around the qubit adding to decoherence of the qubit in subsequent experiments and/or slowing down the experimental repetition rate. Using microwave techniques to measure the response of the SQUID, the measurement time is often decreased and no heat is dissipated around the qubit. However, the SQUID remains in place and may cause decoherence as described earlier.

A few designs do not rely on coupling to an external SQUID in order to measure the state of the qubit. One well-known design includes coupling the qubit to a superconducting coplanar waveguide resonator. The measurement is done via phase detection of a microwave signal passed through the resonator because the phase of the transmitted signal depends on the state of the qubit. Although no external SQUID is required, a relatively strong coupling between the qubit and a reasonably large superconducting resonator is still needed. Furthermore, this measurement probes the qubit state indirectly by determining the transmission through another circuit element, namely a carefully engineered coplanar waveguide resonator. Finally, it is also not clear how to couple multiple qubits together in a straightforward manner.

Another well-known design also couples the qubit to an external superconducting resonator. However, in this case the qubit state is measured by applying a microwave signal that is tuned to the energy difference between one of the qubit states and a third auxiliary level. If that qubit state is populated, the system undergoes Rabi oscillations between that and the auxiliary level. By tuning the power of the microwave signal it is possible to match the Rabi frequency to the frequency of the external superconducting resonator. As a result, the external resonator is driven by the Rabi flopping which gives rise to a measurable voltage signal. Therefore, the qubit measurement is a voltage measurement across the external resonator. This technique is also an indirect measurement of the qubit state by probing the response of another superconducting circuit element, and requires cumbersome calibrations.

SUMMARY OF THE INVENTION

The shortcomings of the prior art are overcome and additional advantages are provided through the provision of a method for determining whether a quantum system comprising a superconducting qubit is occupying a first basis state or a second basis state once a measurement is performed. The method, comprising: applying a signal having a frequency through a transmission line coupled to the superconducting qubit characterized by two distinct, separate, and stable states of differing resonance frequencies each corresponding to the occupation of the first or second basis state prior to measurement; and measuring at least one of an output power or phase at an output port of the transmission line, wherein the measured output power or phase is indicative of whether the superconducting qubit is occupying the first basis state or the second basis state.

The shortcomings of the prior art are overcome and additional advantages are further provided through the provision of a quantum computing system, comprising: a transmission line having an input port and an output port; and a superconducting qubit directly coupled to the transmission line, the superconducting qubit being configured to occupy a first basis state or a second basis state once a measurement is performed, and the superconducting qubit being characterized by two distinct, separate, and stable states of differing resonance frequencies each corresponding to the occupation of the first or second basis state, an output power or phase being measured at the output port of the transmission line that determines whether the system is occupying the first basis state or the second basis state.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for determining if a quantum system comprising a superconducting qubit is occupying a first basis state or a second basis state once a measurement is performed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

The present invention and the various features and advantageous details thereof are explained more fully with reference to the non-limiting embodiments that are illustrated in the accompany drawings and detailed in the following description. It should be noted that the features illustrated in the drawings are not necessarily drawn to scale. Descriptions of well-known or conventional components and processing techniques are omitted so as to not necessarily obscure the present invention in detail. The examples used herein are intended merely to facilitate an understanding of ways in which the invention may be practiced and to further enable those of skill in the art to practice the invention. Accordingly, the examples should not be construed as limiting the scope of the invention.

Exemplary embodiments of a quantum computing system for implementing a method for determining if a quantum system comprising a superconducting qubit is occupying a first basis or quantum state (e.g., |0™) or a second basis or quantum state (e.g., |1™) once a measurement is performed in accordance with the present invention will now be described with reference to the drawings. An exemplary embodiment of the quantum computing system described herein provides a direct read-out of the qubit state using microwaves without requiring an external SQUID or coupling to other resonators. Compared with other methods that require external SQUIDs, the total number of bias lines per qubit is reduced and provides more flexible lay-out options of the actual qubit design. This helps facilitate coupling between multiple qubits.

Figure 1:
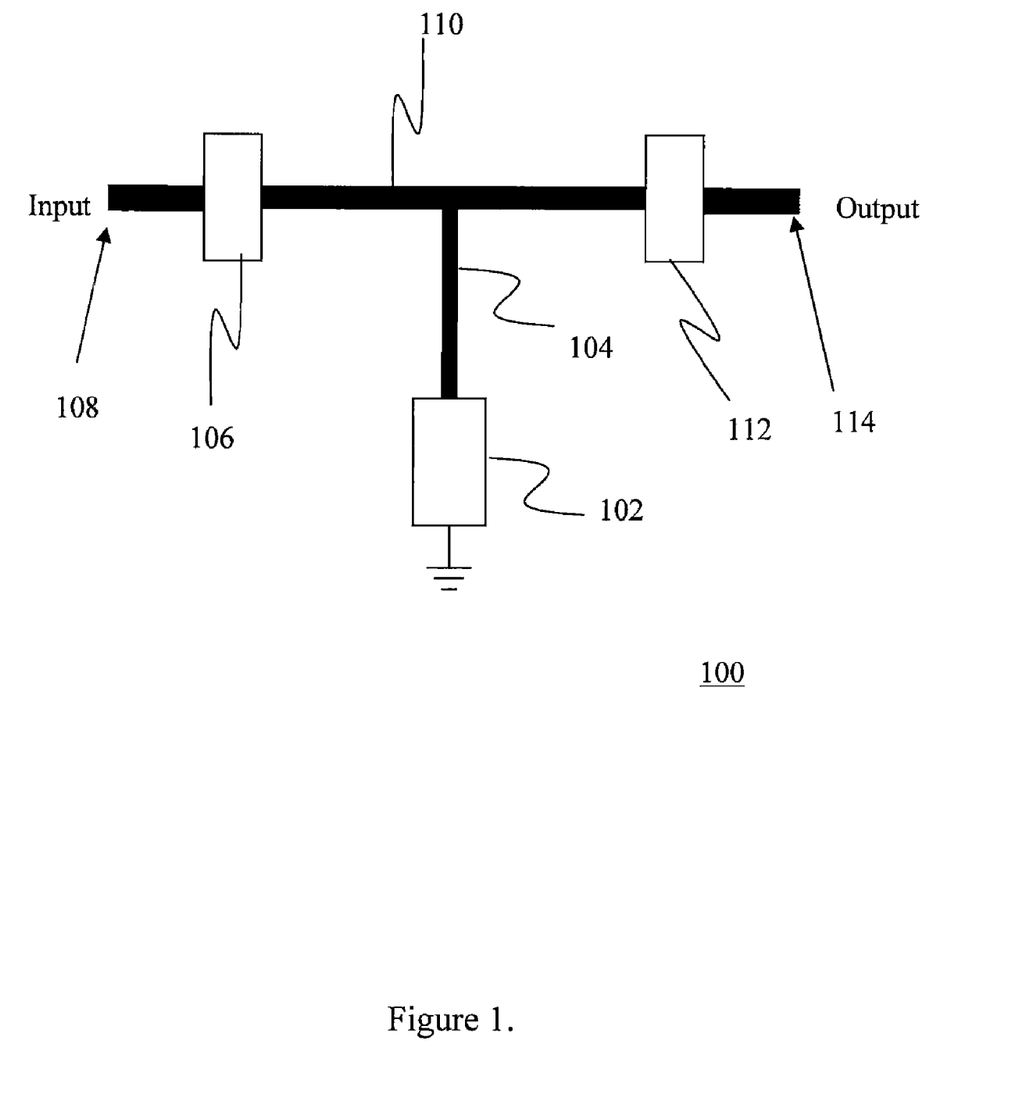
FIG. 1 depicts a circuit layout of the qubit and its read-out circuitry in accordance with one exemplary embodiment of the present invention.

FIG. 1 is a circuit layout 100 of a quantum computing system in accordance with one exemplary of the present invention. The circuit layout 100 includes a qubit 102. The qubit is connected to wiring 104 terminating in a circuit element that couples capacitively or inductively 106 to an input end 108 of a transmission line 110 and also couples capacitively or inductively 112 to an output end 114 of the transmission line 110.

Figure 2:
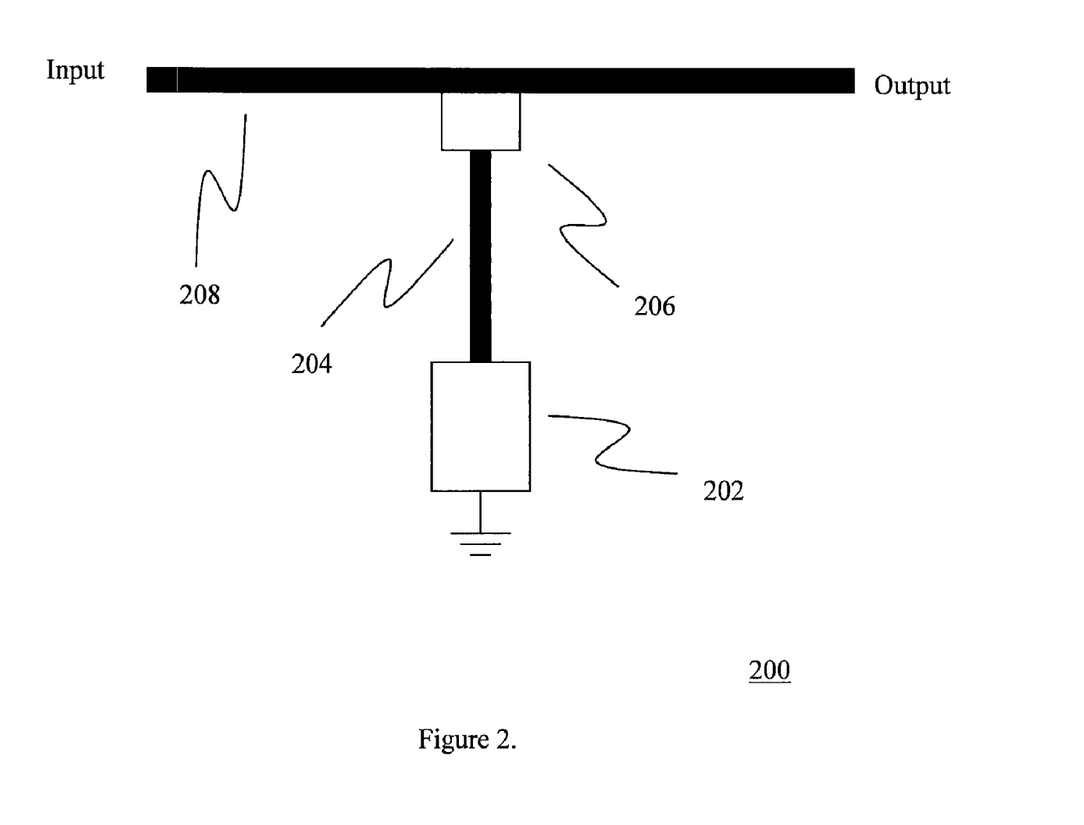
FIG. 2 depicts another circuit layout of the qubit and its read-out circuitry in accordance with one exemplary embodiment of the present invention.

FIG. 2 is another circuit layout 200 of a quantum system in accordance with one exemplary embodiment of the present invention. The circuit 200 includes a qubit 202. The qubit is connected to wiring 204 terminating in a circuit element that couples capacitively or inductively 206 to a transmission line 208.

In exemplary embodiments of the present invention, the qubit includes the following properties: after measurement, the qubit ends up in one of two different states (|A™ or |B™) depending on whether the qubit was in state |0™ or state |1™ prior to measurement. The two states |A™ and |B™ should be stable over the duration of the read-out and each should correspond to a resonance frequency that is different from the other. This way, after measurement, the qubit has a resonance frequency, which depends on the qubit state prior to measurement.

The read-out following the qubit measurement is then performed by determining which of the two resonance frequencies the qubit has. This can be accomplished through various techniques. In a first technique, a microwave signal is applied to the input of the circuit and tuned to the resonance of one of the post measurement quasi-stable states in accordance with one exemplary embodiment. If the qubit is in the state that has the same resonance frequency as that of the applied signal, the applied microwave signal passes to the output or gets absorbed by the qubit, depending on exactly how one chooses to couple the qubit to the transmission lines (i.e. depending on whether the circuit layout being used is one of FIG. 1 or 2). If the qubit is in a state that does not have the same resonance as that of the applied signal, the signal then either gets absorbed by the qubit or passes to the output. Therefore, depending on the qubit state a microwave signal is present or absent at the output. The determination of whether a microwave signal is present or not can be achieved in a variety of ways, for example, using IQ mixers, threshold detectors and so forth.

In a second technique, a microwave signal is applied in-between the two possible resonance frequencies of the system in accordance with one exemplary embodiment. Depending on which state the qubit is in after the measurement, the applied signal will either be above or below the qubit resonance frequency. Therefore, the signal that passes from the input to the output undergoes a phase shift depending on whether or not the qubit resonance is below or above the frequency of the applied signal. The determination of the phase of the transmitted signal can be achieved in a variety of well-known techniques, such as, also using IQ mixers, threshold detectors, and so forth.

In most cases, additional amplifiers such as SQUID amplifiers or HEMT amplifiers may be required as well as room temperature microwave electronics such as IQ mixers, and so forth.

Figure 3:
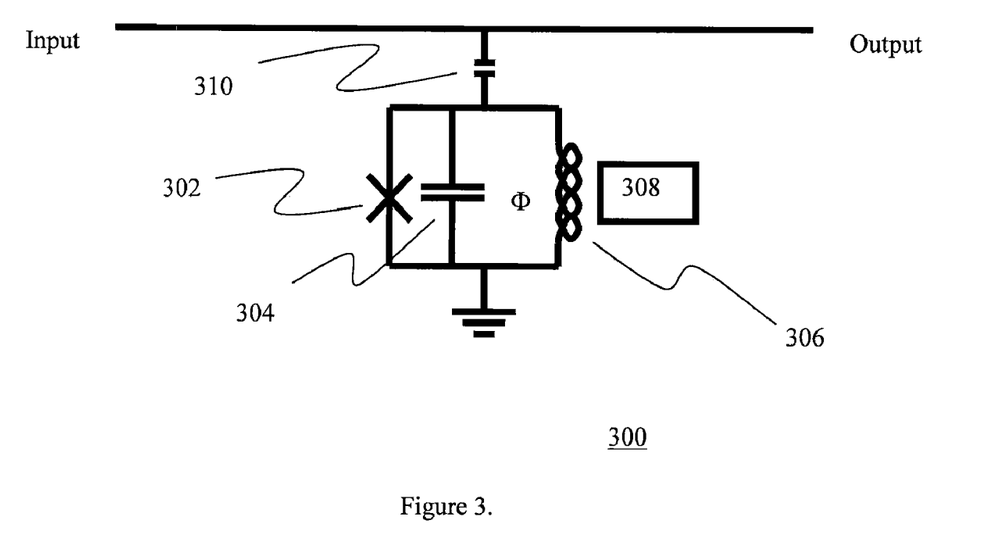
FIG. 3 depicts an schematic of a qubit in accordance with one exemplary embodiment of the present invention.

In accordance with one preferred embodiment of the present invention, the qubit consists of a Josephson junction 302, a capacitor 304, and an inductor 306 each connected in parallel with one another as shown in FIG. 3. The loop formed by the junction 302 and the inductor 306 is flux biased by an external flux bias source 308, generating a flux $\Phi$. The loop is capacitively coupled by a coupling capacitor 310 to the input and output ports of external bias lines. In accordance with one exemplary embodiment, the inductance 306 is approximately in the range of 100 picohenrys (pH) to 2 nanohenrys (nH), and the capacitor 304 is in the range of 0.2 picofarads (pF) to 4 picofarads (pF). The critical current $I_0$ of each junction should be about one to three times $\Phi_0/2L$ where L is the value of the inductor 306 and $\Phi_0$ is the flux quantum. In accordance with one exemplary embodiment, the Josephson junction has an effective critical current ranging approximately from 0.5 to 3 microamperes. As a result, the resonance frequencies of the qubit range approximately between a few hundred MHz up to about 50 GHz. The coupling capacitor 310 of the qubit can be made as small as possible as long as the microwave read-out can still be performed in a reasonable time. The qubit described in this exemplary embodiment is also known as a flux biased phase qubit.

Figure 4A:
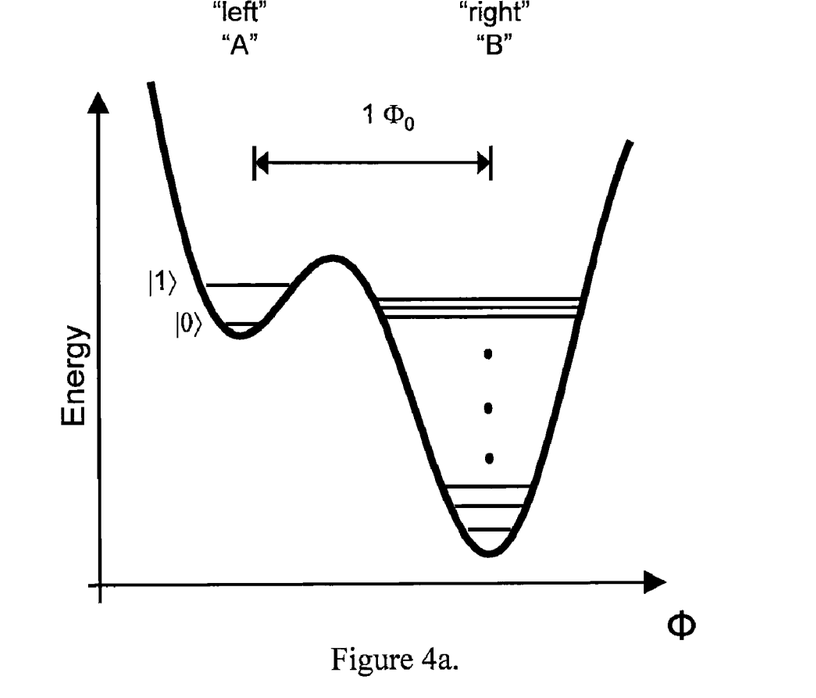
FIG. 4a depicts an exemplary graph of the potential energy of the qubit in FIG. 3 in accordance with one exemplary embodiment of the present invention.

FIG. 4a is an exemplary diagram illustrating the potential energy of the flux biased phase qubit as described in FIG. 3. The operations of the flux biased phase qubit as described herein are similar to the operations of conventional phase qubits. For a flux bias $\Phi \sim 0.7\Phi_0$, the potential exhibits two minima, which are indicated as the "left" and "right" well respectively. The qubit operations are generally performed in the shallow well where 3-5 energy levels are present. The lowest two energy levels form the qubit and operations are implemented by applying microwave pulses tuned to the resonance of these two energy levels. The measurement of the qubit is done by applying an adiabatic flux pulse effectively lowering the barrier between the two wells. If the system is in the excited state |1™ and the pulse is properly calibrated, then it will tunnel to the other well because it is close to the top of the barrier. If the system is in the ground state of the shallow well, the barrier is still sufficiently high so that this state will not tunnel. Therefore, depending on the qubit state, the system either ends up in the "right" or "left" well corresponding to two different fluxes threading the main qubit loop. This follows the requirements described earlier calling for the qubit to end up in state |A™ if the pre-measurement state was |0™ and |B™ if the pre-measurement state was |1™. In this case |A™ and |B™ correspond to the "left" and "right" wells.

The system read-out thus far has typically been done with a SQUID using a variety of techniques as described above because the "left" and "right" states correspond to different fluxes threading the qubit loop. The different fluxes are detected by an external SQUID.

Figure 4B:
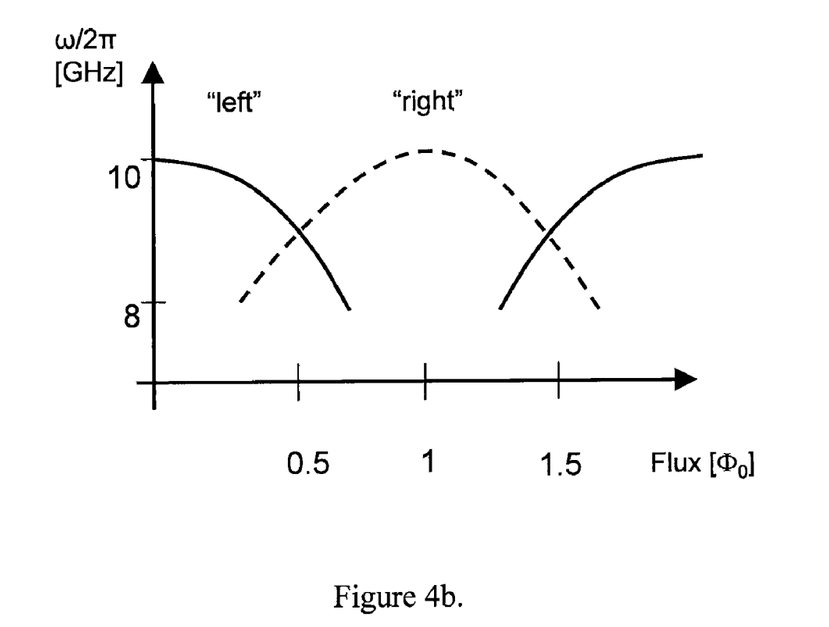
FIG. 4b depicts an exemplary graph of the resonance frequency of the system versus flux in accordance with one exemplary embodiment of the present invention.

In accordance with one exemplary embodiment of the present invention, the system read-out is performed using microwaves. The resonance frequency of the system differs depending on whether the system state is "left" or "right". FIG. 4b illustrates a diagram of the resonance frequency $(\omega/2\pi)$ of the system versus flux. Over some flux range, the system is hysteretic and has two different resonance frequencies in accordance with one exemplary embodiment. The nature of exhibiting two resonance frequencies means that a "left" and "right" well are present. After the qubit measurement, the system is left in the "left" or "right" well depending on whether the qubit state was |0™ or |1™ and consequently has two distinctly different resonance frequencies. The next step is to determine which of the two resonance frequencies the system is in.

In accordance with one exemplary embodiment, the circuit layout in FIG. 3 is used to determine the resonance frequency. In this embodiment, the qubit is capacitively coupled to a transmission line. When plotting the output power, referenced to the input power, versus frequency there is a pronounced dip at the resonance frequency of the qubit. Because the qubit can be in two different resonance frequencies, depending on the measurement outcome (i.e. whether the qubit is in the "left" or "right" configuration) this dip occurs at two possible frequencies. Exemplary embodiments of the present invention determine which resonance frequency the system is in or where this dip occurs.

Figure 5:
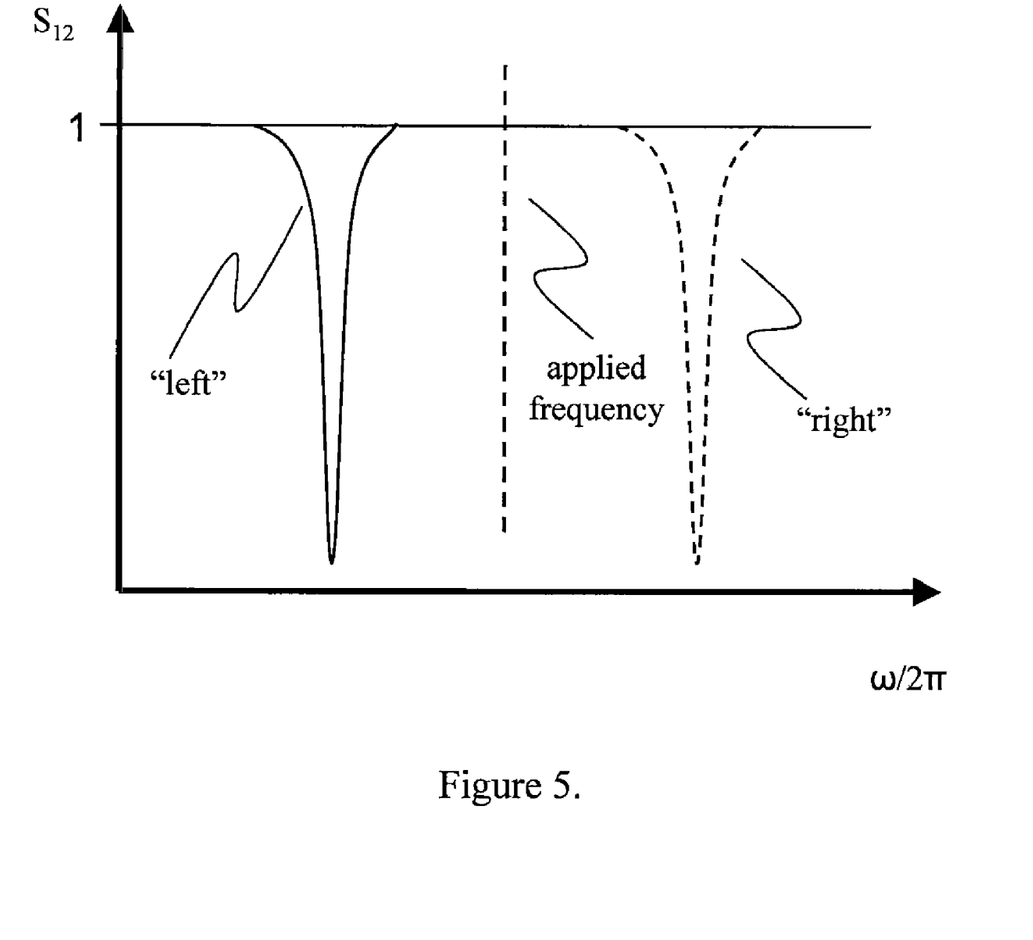
FIG. 5 depicts an exemplary diagram of the predicted output power, referenced to the input microwave power, versus frequency for the embodiment shown in FIG. 3 at the read-out flux bias in accordance with one exemplary embodiment of the present invention.

FIG. 5 is an exemplary diagram illustrating the predicted output power, referenced to the input power, for a flux biased phase qubit biased at flux $\Phi$ of the loop near but not equal to $0.5\Phi_0$. This flux setting is different from the one used during qubit operations but can be easily achieved after the qubit measurement by applying a flux bias pulse. For this flux setting, if the system is in the "left" configuration, the resonance frequency is lower than what it would be if the system was in the "right" configuration. The microwave signal applied in-between these two resonance frequencies will be fully transmitted through the structure with a phase shift of 180 degree depending on whether or not the applied signal is above or below the resonance frequency of the system. By using external amplifiers, and IQ mixers it is possible to determine the phase of the transmitted signal with a few microsecond measurement time or less.

The described results thus far apply to the idealized situation in which the quality factor of the qubit resonance is dominated by the coupling of the qubit via the coupling capacitor 310. If internal losses of the qubit are present then the transmitted signal undergoes a phase shift that is less than 180 degrees and depends on how strong the internal losses of the qubit are. The smaller the phase shift, the longer it takes to determine it. Therefore, the read-out time is determined by the total amount of phase shift. A faster read-out time requires a stronger coupling of the qubit to the transmission line. However, it is undesirable for the qubit to be dominated by the coupling to the transmission line. Consequently, there is likely an optimal coupling strength that depends on the internal loss of the qubit and other user defined specifics.

Figure 6:
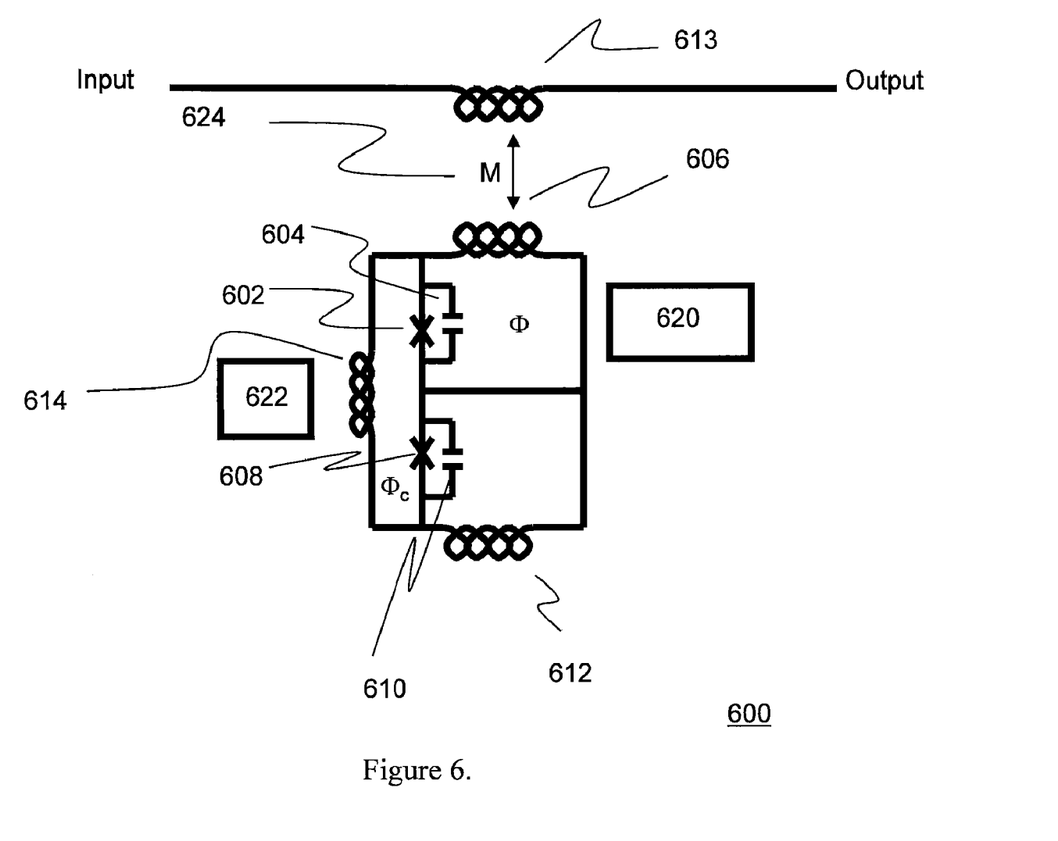
FIG. 6 depicts another circuit layout in accordance with one exemplary embodiment of the present invention.

FIG. 6 is another circuit layout 600 of the quantum system in accordance with one exemplary embodiment. The circuit layout 600 comprises a device with three loops. The first loop includes a Josephson junction 602 in parallel with a capacitor 604 and a loop inductance 606. The second loop includes a second Josephson junction 608 in parallel with a second capacitor 610 and a second loop inductance 612 that has the same inductance value as the inductor 606. The third loop includes both Josephson junctions (602, 608) and a third loop inductance 614 whose inductance is much smaller than the loop inductance 606 or 612. The ratio of the loop inductances 614 to 606 is smaller than 0.1 in accordance with one embodiment. The first loop is flux biased by an external circuit 620 that generates a flux $\Phi$ in the loop. The second loop is not flux biased in accordance with one embodiment. The third loop is flux biased by an external circuit 622 that generates a flux $\Phi_c$ in the third loop in the loop. The first loop is inductively coupled via a mutual inductance (M) 624 to another inductor 626 which in turn is coupled to the input and output ports of a bias line. For this device to be a useful qubit, the critical current of the junction should be larger than $\Phi_0/2L$ where L is the inductance value of the large loop (606 or 612). Typically, no extra capacitors are needed as the self-capacitance of the junction is sufficient. The mutual inductance M 624 can be as small as possible as long as the resonance of the circuit can still be measured. In one exemplary embodiment, the mutual inductance ranges approximately from 0.1 to 10 picohenrys.

As shown, the qubit in FIG. 6 includes 2 Josephson junctions and is not coupled to a transmission line resonator. The qubit is operated with a flux bias $\Phi = \Phi_0$ and $\Phi_c \sim 0.3\text{-}0.4\Phi_0$ in accordance with one exemplary embodiment. With these flux biases the qubit potential is symmetric and is close to a double well potential with a relatively low barrier between the two wells. The qubit frequency is in the order of several GHz. The qubit operations are performed by applying a microwave signal to the input port of the transmission line, tuned to the qubit resonance frequency.

In accordance with one exemplary embodiment, the measurement is performed in two steps. First, shift flux $\Phi$ by a small amount (typically 1-2 m$\Phi_0$). This makes the potential slightly asymmetric and is necessary for the measurement to be successful. Then, apply a pulse on the control flux $\Phi_c$ such that $\Phi_c \sim 0\Phi_0$. This pulse increases the potential barrier between the two wells and the qubit state collapses either to the "left" or "right" well depending on whether the qubit state was |0™ or |1™. Note that if the flux $\Phi$ is not shifted, the state would collapse to the "left" and "right" wells with equal probability and independent on what state the qubit was in prior to measurement. The states "left" and "right" are stable over a long time (a second or longer). Similar to the qubit of FIG. 3, the qubit design in FIG. 6 also now has two different resonance frequencies depending on whether the system is in the "left" or "right" configuration. The determination of the system resonance frequency now follows the same arguments as those for FIG. 3.

It should be understood that the two circuit layouts of FIG. 3 and FIG. 6 serve as examples and both share the general qubit characteristics described earlier. The qubit is configured to be left in two stable configurations after the measurement where each configuration corresponds to a different resonance frequency and correlates to the qubit states |0™ or |1™ prior to measurement. Any other superconducting qubit that shares these characteristics can be read-out using the technique described here without the need to couple the qubit to SQUIDs or other resonators.

In accordance with one exemplary embodiment, calibration procedures are used with the qubit in FIG. 3. The first step of calibration includes measuring the output power $S_{12}$ at the output port of the transmission line, referenced to the input power versus applied frequency and flux $\Phi$. For each flux $\Phi$, the output power $S_{12}$ is expected to show a pronounced dip when the applied frequency matches the resonance frequency of the qubit. FIG. 5 shows a predicted example of one of such traces. This allows direct probing of the qubit resonance frequency versus flux, and by performing sufficiently large flux excursions a plot of qubit resonance frequency versus flux similar to the one shown in FIG. 4b is expected. Note that due to the hystersis of the qubit over a small flux range, the qubit can have two possible resonance frequencies which correspond to whether the qubit is located in the left or right well.

The second step of calibration includes calibrating the measurement pulse. Such step consists of applying a flux pulse to initialize the qubit in the left well. The flux is then changed to some predetermined dc value that is close to but less than 0.7 $\Phi_0$. At this flux bias the potential well of the qubit should be deep enough to ensure that neither the ground nor the excited state tunnels with any appreciable probability. Typically, when several energy levels are present this condition is satisfied. Next, a fast flux is applied that increases the flux $\Phi$. This is followed by measuring if the dip in $S_{12}$ occurs at the calibrated value for the left or right well, measured in the previous step. If the dip in $S_{12}$ occurs at the calibrated value for the right well, then the qubit tunneled from the left into the right well due to the fast flux pulse. This step is repeated sufficiently many times to obtain the probability of the qubit tunneling.

The third step of calibration includes repeating step two for increasing values of the fast flux pulse amplitude. Calculations show that when the probability of tunneling is about 4% the optimal amplitude is obtained. Further fine-tuning is possible at a later stage by maximizing the measurement fidelity.

The last step consists of repeating steps two and three for a range of dc flux biases to obtain a map the optimal measurement pulse amplitude versus flux bias.

At this stage the qubit is fully calibrated. For each flux bias, the resonance frequency of the qubit is known in addition to the optimal measurement amplitude. Logic operations can now be performed by applying a sequence of microwave pulses. The measurement is done by applying the fast flux pulse. The final read-out or determination of whether the qubit is in the left or right well, is performed by executing the $S_{12}$ measurement as described above.

The capabilities of the present invention can be implemented in software, firmware, hardware or some combination thereof As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for determining if a quantum system including a superconducting qubit occupies a first state |0⟩ or a second state |1⟩, the method comprising:
   applying an input pulse to the superconducting qubit;
   applying a signal having a frequency through a transmission line having an output and coupled to the superconducting qubit; and
   measuring a resonance frequency from the superconducting qubit at the output port,
   wherein the resonance frequency can be one of two distinct values, a distinct first value corresponding to a first quantum well, and a second distinct value corresponding to a second quantum well,
   wherein if the resonant frequency is equal to the first value, then the qubit occupies the state |0⟩ prior to applying the input pulse and the state |0⟩ remained in the first quantum well after applying the input pulse, and if the resonant frequency is equal to the second value, then the qubit occupies the state |1⟩ prior to applying the input pulse and the state |1⟩ tunneled to the second quantum well subsequent to applying the input pulse.

2. The method as in claim 1, wherein applying an input pulse to the superconducting qubit is performed by applying a first flux-biasing pulse to the superconducting qubit through an external circuit.

3. The method as in claim 1, wherein the superconducting qubit comprises a Josephson junction coupled in parallel with a capacitor and a superconducting loop.

4. The method as in claim 3, wherein the Josephson junction has an effective critical current ranging from about 0.5 to about 3 microamperes.

5. The method as in claim 4, wherein the capacitor is in the range of about 0.2 to about 4 picofarads.

6. The method as in claim 4, wherein the superconducting loop comprises a loop inductance being in the range of about 100 picohenrys to about 2 nanohenrys.

7. The method as in claim 4, wherein the superconducting qubit has differing resonant frequencies ranging from about 1 to about 50 giga-hertz.

8. The method as in claim 1, wherein the superconducting qubit is capacitively or inductively coupled to the transmission line.

9. The method as in claim 1, wherein the superconducting qubit is capacitively coupled to the transmission line with a coupling capacitance ranging from about 0.1 to about 10 femtofarads.

10. The method as in claim 1, wherein the superconducting qubit is inductively coupled to the transmission line with a mutual inductance ranging from about 0.1 to about 10 picohenrys.

11. The method as in claim 1, wherein the superconducting qubit is a charge qubit, a hybrid qubit, a phase qubit, or a flux qubit having characteristics of two distinct, separate, and stable states of difference resonance frequencies each corresponding to the occupation of the first state or the second state prior to measurement.

12. The method as in claim 1, wherein the superconducting qubit is directly coupled to the transmission line.

13. The method as claimed in claim 1 wherein the resonance frequency of the quantum system is measured via at least one of an output power or phase at an output port of the transmission line, wherein the measured output power or phase is indicative of whether the superconducting qubit is occupying the first state |0⟩ or the second state |1⟩.

14. A method for determining if a quantum system including a superconducting qubit occupies a first state |0⟩ or a second state |1⟩, the method comprising:
   applying a flux biasing pulse to the superconducting qubit; and
   measuring a resonance frequency from the superconducting qubit;
   wherein the resonance frequency can be one of two distinct values, a first value corresponding to a first quantum well, a second value corresponding to a second quantum well,
   wherein if the resonant frequency is equal to the first value, then the qubit occupies the state |0⟩ prior to applying the flux biasing pulse and the state |0⟩ remained in the first quantum well after applying the flux biasing, and if the resonant frequency is equal to the second value, then the qubit occupies the state |1⟩ prior to applying the flux biasing pulse and the state |1⟩ tunneled to the second quantum well subsequent to applying the flux biasing pulse.

15. A method for determining if a quantum system including a superconducting qubit occupies a first state |0⟩ or a second state |1⟩, the method comprising:
  applying a flux biasing pulse to the superconducting qubit;
  applying a signal having a frequency through a transmission line having an output port and coupled to the superconducting qubit; and
  measuring at least one of an output power or phase at the output port of the transmission line, wherein the measured output power or phase is indicative of whether the superconducting qubit is occupying the first state |0⟩ or the second state |1⟩, the measured output power or phase corresponding to a resonance frequency from the superconducting qubit;
  wherein the resonance frequency can be one of two distinct values, a first value corresponding to a first quantum well, a second value corresponding to a second quantum well,
  wherein if the resonant frequency is equal to the first value, then the qubit occupies the state |0⟩ prior to applying the flux biasing pulse and the state |0⟩ remained in the first quantum well after applying the flux biasing, and if the resonant frequency is equal to the second value, then the qubit occupies the state |1⟩ prior to applying the flux biasing pulse and the state |1⟩ tunneled to the second quantum well subsequent to applying the flux biasing pulse.

16. The method as in claim 1, wherein applying an input pulse to the superconducting qubit is performed by applying a first current-biasing pulse to the superconducting qubit through an external circuit.

* * * * *